(12) United States Patent
Palmisano et al.

(10) Patent No.: US 8,967,977 B2
(45) Date of Patent: Mar. 3, 2015

(54) LOCKED SPACER FOR A GAS TURBINE ENGINE SHAFT

(75) Inventors: Leonard Paul Palmisano, Forestville, CT (US); William Bogue, Hebron, CT (US); Robert J. DeRosa, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 850 days.

(21) Appl. No.: 12/870,890

(22) Filed: Aug. 30, 2010

(65) Prior Publication Data

US 2012/0051886 A1    Mar. 1, 2012

(51) Int. Cl.
*F01D 25/28* (2006.01)
*F01D 25/16* (2006.01)

(52) U.S. Cl.
CPC ..................................... *F01D 25/16* (2013.01)
USPC ..................................... 416/244 A; 464/179

(58) Field of Classification Search
USPC ............. 415/69; 464/179; 403/365, 351, 355, 403/359.5; 29/889.1; 416/244 R, 244 A
See application file for complete search history.

(56) References Cited

U.S. PATENT DOCUMENTS

| | | | |
|---|---|---|---|
| 371,911 A | 10/1887 | Andrews | |
| 922,990 A | 5/1909 | White | |
| 1,267,485 A | 5/1918 | Widdup | |
| 1,383,035 A | 6/1921 | Short | |
| 1,421,441 A | 7/1922 | Flinn | |
| 1,445,693 A | 2/1923 | King | |
| 1,470,966 A | 10/1923 | Erdahl et al. | |
| 1,863,809 A | 6/1932 | Hopkins et al. | |
| 1,868,817 A | 7/1932 | Dunham | |
| 1,981,500 A | 11/1934 | Frelin | |
| 2,089,168 A * | 8/1937 | Brown | 403/259 |
| 2,844,420 A | 7/1958 | Allen | |
| 3,390,926 A | 7/1968 | Woollenweber, Jr. | |
| 3,709,637 A * | 1/1973 | Petrie et al. | 417/405 |
| 3,730,600 A | 5/1973 | Degnan | |
| 4,358,253 A | 11/1982 | Okano et al. | |
| 4,364,717 A | 12/1982 | Schippers et al. | |
| 4,427,309 A | 1/1984 | Blake | |
| 4,605,316 A | 8/1986 | Utecht | |
| 4,738,548 A | 4/1988 | Zlock et al. | |
| 4,813,808 A * | 3/1989 | Gehrke | 403/326 |
| 4,902,144 A | 2/1990 | Thoren | |
| 5,580,183 A * | 12/1996 | Brackoneski et al. | 403/359.1 |
| 5,660,481 A | 8/1997 | Ide | |
| 6,126,321 A | 10/2000 | Fetty et al. | |
| 6,250,878 B1 * | 6/2001 | Wesling et al. | 415/115 |
| 6,338,578 B1 * | 1/2002 | Adde et al. | 384/540 |
| 7,510,372 B2 | 3/2009 | Bogue et al. | |
| 7,665,963 B2 | 2/2010 | Bogue et al. | |
| 2010/0260543 A1 * | 10/2010 | Cameron et al. | 403/355 |

FOREIGN PATENT DOCUMENTS

| | | | |
|---|---|---|---|
| DE | 2061393 | 6/1972 | |
| JP | 01295025 A * | 11/1989 | F16D 1/00 |

* cited by examiner

*Primary Examiner* — Edward Look
*Assistant Examiner* — Juan G Flores
(74) *Attorney, Agent, or Firm* — Carlson, Gaskey & Olds, P.C.

(57) ABSTRACT

A shaft assembly that includes a locked spacer mounted to a shaft shoulder.

13 Claims, 4 Drawing Sheets

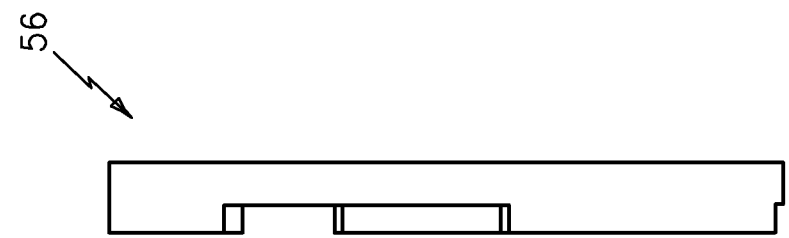
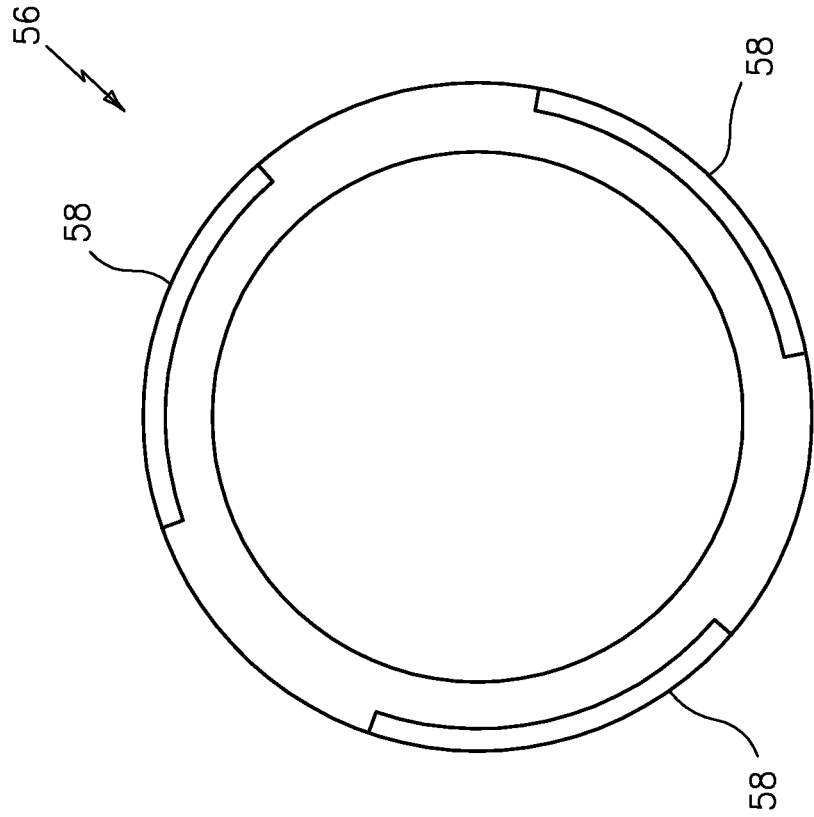

LOCKED SPACER FOR A GAS TURBINE ENGINE SHAFT

BACKGROUND

The present disclosure relates to a gas turbine engine, and more particularly to a locked spacer for a rotor shaft thereof.

Gas turbine engines such as those utilized in aircraft are complex mechanical systems with of a variety of components. Assembly, aftermarket support, repair and overhaul of such complicated machinery may be time intensive and relatively expensive. To facilitate field support of such engines, more modern designs are modular. The engine is designed in a plurality of subassemblies or modules which may be individually removed or assembled to the remainder of the engine modules. Such a modular design allows the removal and replacement of a single module in the field so that the engine may be returned to service as rapidly as possible. The removed module may then be fully disassembled, repaired and/or overhauled at a remote site with minimal overall engine or aircraft down time.

SUMMARY

A shaft assembly according to an exemplary aspect of the present disclosure includes a locked spacer mounted to a shaft shoulder.

A spacer according to an exemplary aspect of the present disclosure includes an annular locked spacer that includes a multiple of keys mountable to a gas turbine engine shaft to define a shaft shoulder.

A shaft assembly for a gas turbine engine according to an exemplary aspect of the present disclosure includes a first shaft and a second shaft with a shaft shoulder. The second shaft is mounted to the first shaft, the second shaft at least partially radially inboard of said first shaft, the second shaft having a locked spacer mounted to the shaft shoulder.

A method of adjusting the axial length of a shaft assembly for a gas turbine engine according to an exemplary aspect of the present disclosure includes mounting a locked spacer to a shaft shoulder of a first shaft and mounting a bearing to abut the locked spacer.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIGS. 5A and 5B are views of the locked spacer.

DETAILED DESCRIPTION

Figure 1:
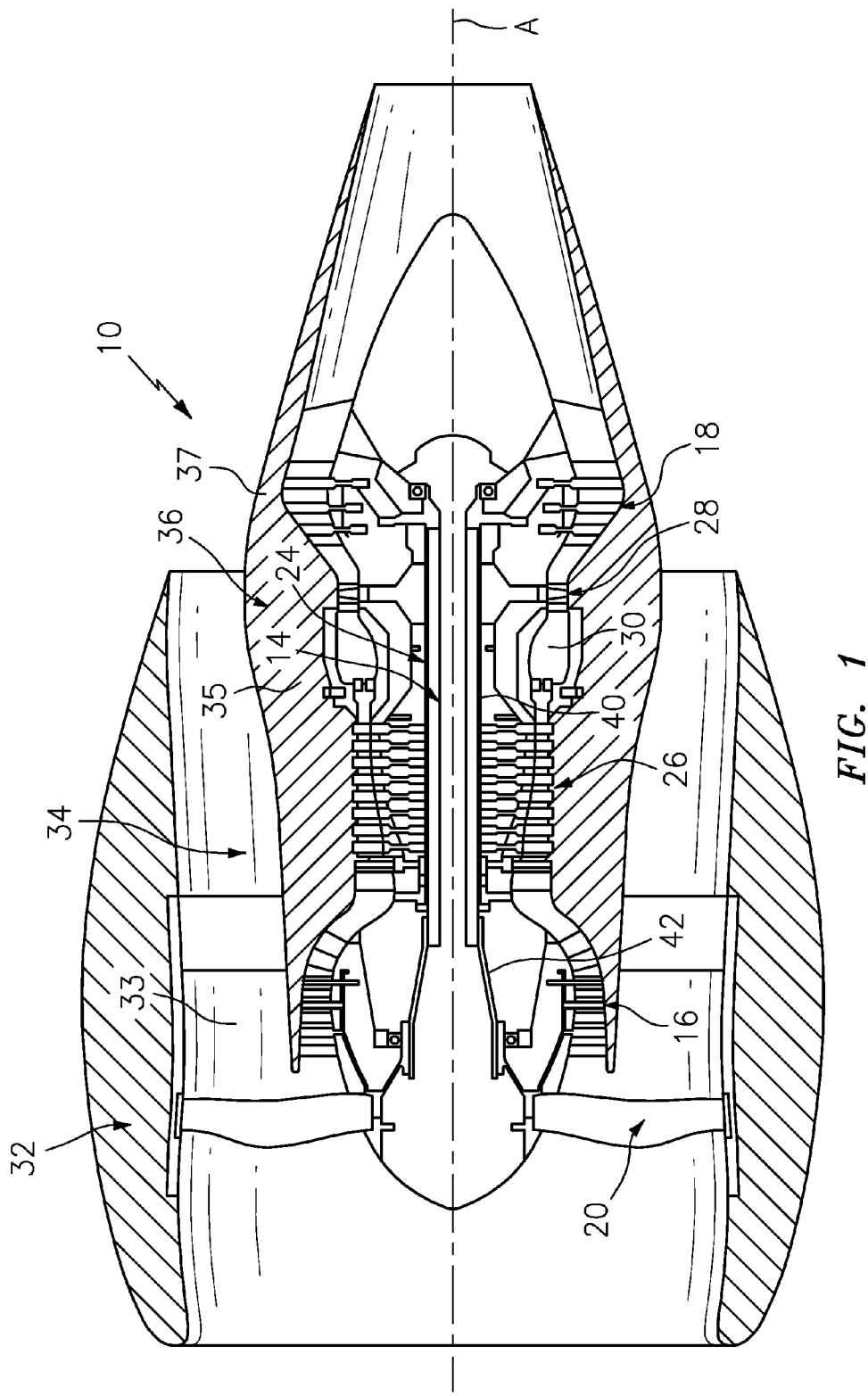
FIG. 1 is a general schematic view of a gas turbine engine.

FIG. 1 illustrates a general schematic view of a gas turbine engine 10 such as a gas turbine engine for propulsion. While a two spool high bypass turbofan engine is schematically illustrated in the disclosed non-limiting embodiment, it should be understood that the disclosure is applicable to other gas turbine engine configurations, including, for example, gas turbines for power generation, turbojet engines, low bypass turbofan engines, turboshaft engines, etc. It should also be understood that shafts may be present in smaller formats in gearboxes where the limitations associated with carburized gear teeth preclude many repair options.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Air compressed in the compressors 16, 26 is mixed with fuel, burned in the combustor 30, and expanded in turbines 18, 28. The air compressed in the compressors 16, 26 and the fuel mixture expanded in the turbines 18, 28 may be referred to as a hot gas stream along a core gas path. The turbines 18, 28, in response to the expansion, drive the compressors 16, 26 and fan section 20.

Figure 2:
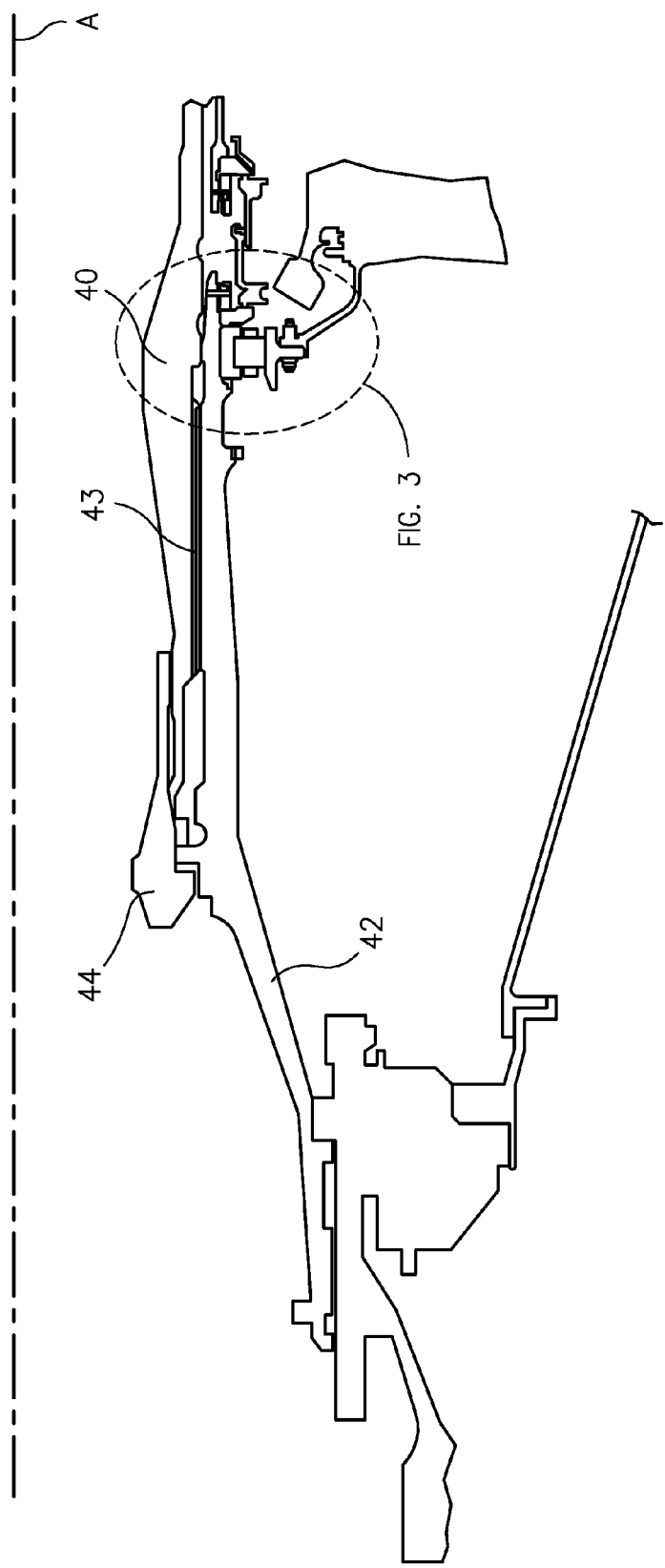
FIG. 2 is a sectional view of a shaft assembly for the gas turbine engine.

The engine 10 is modularly constructed to include sequentially, a forward fan module 32, an intermediate module 33, a compressor module 34, a burner module 35, a high pressure turbine module 36, and a low pressure turbine module 37 along axis A. An elongated Low Pressure Turbine (LPT) shaft 40 generally extends from the low pressure turbine module 37 through the intermediate modules for splined engagement with a Low Pressure Compressor (LPC) shaft 42 which connects the low pressure turbine module 32 and the compressor module 26. In one non-limiting embodiment, the LPT shaft 40 is retained to the LPC shaft 42 at a splined interface 43 with a shaft nut 44 which is internal to the LPT shaft 40 and the LPC shaft 42 (FIG. 2). It should be understood that this interface is representative of one disclosed non-limiting embodiment and various shaft interfaces at various engine locations will benefit herefrom.

Figure 3:
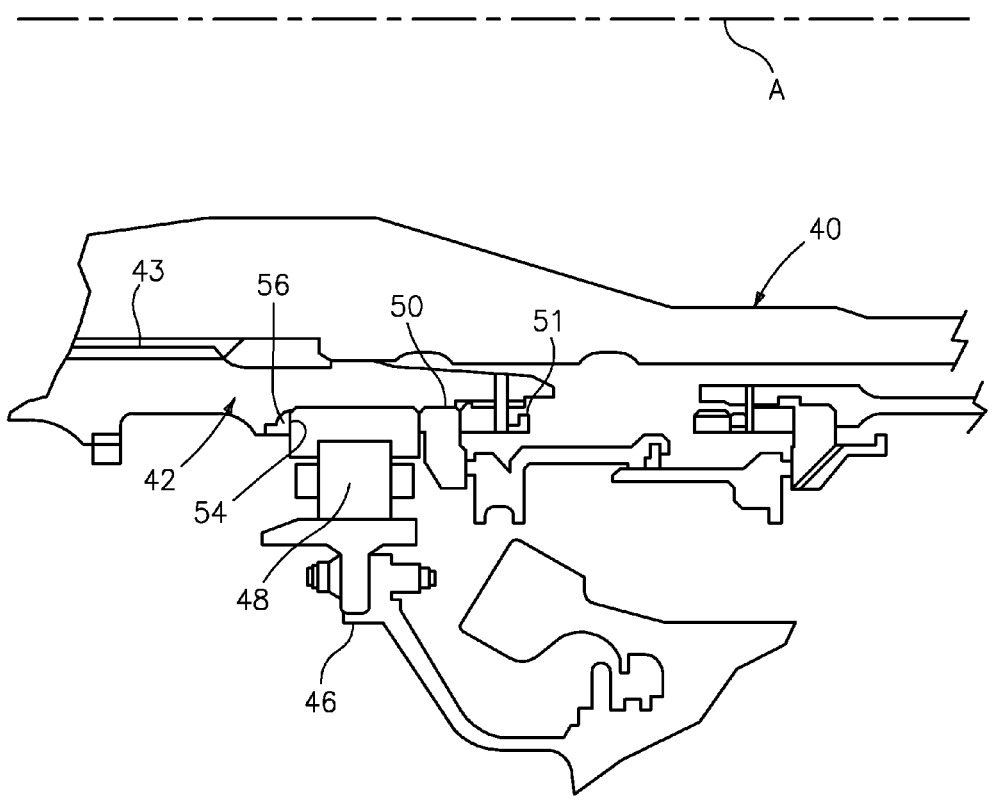
FIG. 3 is an expanded sectional view of the shaft assembly.

With reference to FIG. 3, a stationary support structure 46 supports the shaft assembly or spool of the LPT shaft 40 and the LPC shaft 42 within a bearing 48. It should be understood that the stationary support structure 46 may take various forms and may include multiple bearings 48. Although the disclosed non-limiting embodiment is illustrated in association with the LPT shaft 40 and the LPC shaft 42 interface, it should be understood that various engine modules and shaft interfaces will also benefit herefrom.

To control the axial intermodular fits and the splined interface displacement between the LPT shaft 40 and the LPC shaft 42, a spacer 50 and a retainer 51 abuts the bearing 48. Over time, the bearing 48 may wear against a shaft shoulder 54 in the LPC shaft 42 and thereby necessitate replacement with a thicker spacer to maintain the designed axial intermodular fits and the splined interface displacement. The LPC shaft 42 locates a series of details coaxially and imparts a rotational load to all details concurrently. Conventionally, the details concurrent rotation is achieved by friction between the aft face of one detail with the forward face of the adjacent detail. The details are held under stress between a nut spanning the diameter of the shaft 42 and the shaft shoulder 54. This load amplifies the frictional forces and allows for concurrent rotation. Wear is frequently associated with fretting at the interface of these mating surfaces induced by the minor movements between the details associated with vibratory oscillation and thermal expansion. The shaft shoulder 54 may be coated in order to mitigate this wear and to restore material loss associated with this wear, but the size and material of the shaft usually precludes the optimum coatings. As a result wear on the shaft shoulder 54 can exceed the capabilities of current dimensional restoration methods. That is, eventually, the shaft shoulder 54 may wear to the extent that a replacement shim may no longer be used to axially compensate and the LPC shaft 42 must heretofore be replaced in its entirety.

Figure 4:
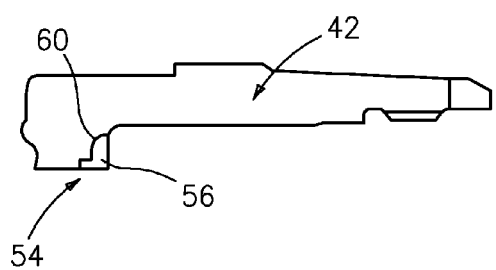
FIG. 4 is an expanded view of the locked spacer interface of the shaft assembly.

With reference to FIG. 4, the shaft shoulder 54 is reinforced by a locked spacer 56 (FIGS. 5A and 5B). It should be understood that although the LPC shaft 42 is utilized in the disclosed, non-limiting embodiment, various shafts will benefit herefrom.

The locked spacer 56 may be manufactured of an equivalent or different material than that of the LPC shaft 42. The locked spacer 56 may also be conducive to receipt of surface processes and treatments which are not practical or applicable to the relatively much larger LPC shaft 42. In one non-limiting embodiment the locked spacer 56 may be manufactured of a steel alloy while the LPC shaft 42 is typically manufactured of a titanium alloy.

With reference to FIGS. 5A and 5B, the locked spacer 56 is an annular component with a multiple of keys 58 which fit within corresponding slots 60 within the LPC shaft 42 (FIG. 4). The keys 58 which fit within corresponding slots 60 provide a geometric lock with the LPC shaft 42 to prevent fretting of the shaft 42 behind the locked spacer 56 and to ensure that the details do not rotate out of synch with the LPC shaft 42. In addition, an adhesive may be further utilized to bond the locked spacer 54 to the LPC shaft 42. Alternatively, materials may be matched such that an interference fit is maintained between the keys 58 and the diametric surface of the LPC shaft 42 throughout the entire gamut of running conditions (temperature, rotational loads, etc. . . . ) to further improve maintaining the locked spacer 56 co-rotation with the LPC shaft 42.

It should be understood that like reference numerals identify corresponding or similar elements throughout the several drawings. It should also be understood that although a particular component arrangement is disclosed in the illustrated embodiment, other arrangements will benefit herefrom.

Although particular shoulder sequences are shown, described, and claimed, it should be understood that shoulders may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of adjusting the axial length of a shaft assembly for a gas turbine engine comprising:
providing a first shaft rotatable about a central axis and having a diametrically outer surface and a diametrically inner surface with respect to said central axis, said first shaft including a radial step extending radially inwardly from said diametrically outer surface to a diametrically intermediate surface located radially between said diametrically outer surface and said diametrically inner surface, said radial step including an axially facing stop surface with a multiple of slots therethrough and an additional radial step extending radially inwardly from said diametrically intermediate surface toward said diametrically inner surface;
mounting a locked spacer including a multiple of key tabs to the first shaft such that the multiple of key tabs mate with the multiple of slots, said locked spacer including an annular body having an axially facing land that abuts said additional radial step; and
mounting a bearing to abut the locked spacer.

2. A method as recited in claim 1 further comprising:
mounting a second shaft to the first shaft.

3. A shaft assembly comprising:
a shaft rotatable about a central axis and having a diametrically outer surface and a diametrically inner surface with respect to said central axis, said shaft including a radial step extending radially inwardly from said diametrically outer surface to a diametrically intermediate surface located radially between said diametrically outer surface and said diametrically inner surface, said radial step including an axially facing stop surface with a multiple of slots therethrough and an additional radial step extending radially inwardly from said diametrically intermediate surface toward said diametrically inner surface; and
a locked spacer mounted to said shaft, said locked spacer abutting said axially facing stop surface and having a multiple of key tabs interlocking with said multiple of slots,
said locked spacer including an annular body having an axially facing land that abuts said additional radial step.

4. The shaft assembly as recited in claim 3, wherein said locked spacer is annular.

5. The shaft assembly as recited in claim 3, wherein said locked spacer is manufactured of a material different than said shaft.

6. The shaft assembly as recited in claim 3, wherein said locked spacer includes a surface treatment different than said shaft.

7. The shaft assembly as recited in claim 3, wherein said shaft is a low pressure compressor shaft.

8. The shaft assembly as recited in claim 3, wherein said multiple of key tabs are circumferentially spaced about a periphery of said locked spacer.

9. The shaft assembly as recited in claim 3, wherein said locked spacer is mounted to said shaft such that said locked spacer co-rotates with said shaft.

10. The shaft assembly as recited in claim 3, wherein said locked spacer includes an annular body, and said multiple of key tabs are spaced circumferentially about a radially exterior edge of the annular body and extend axially from the annular body, and said annular body includes a contoured surface extending from the multiple of key tabs to a radially interior edge of the annular body.

11. The shaft assembly as recited in claim 3, wherein said locked spacer is manufactured of a first alloy and said shaft is manufactured from a second alloy different from said first alloy.

12. The shaft assembly as recited in claim 3, wherein said diametrically outer surface faces radially outwards.

13. The shaft assembly as recited in claim 3, wherein said shaft is monolithic.

* * * * *